United States Patent
White

(10) Patent No.: US 10,809,744 B2
(45) Date of Patent: Oct. 20, 2020

(54) ROTOR MOMENT CONTROL SYSTEM FOR A ROTARY WING AIRCRAFT

(71) Applicant: Sikorsky Aircraft Corporation, Stratford, CT (US)

(72) Inventor: Matthew A. White, Milford, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 543 days.

(21) Appl. No.: 15/425,634

(22) Filed: Feb. 6, 2017

(65) Prior Publication Data

US 2018/0004229 A1 Jan. 4, 2018

Related U.S. Application Data

(60) Provisional application No. 62/297,631, filed on Feb. 19, 2016.

(51) Int. Cl.
*G05D 1/08* (2006.01)
*B64C 27/57* (2006.01)
*B64C 13/18* (2006.01)
*B64C 13/50* (2006.01)

(52) U.S. Cl.
CPC ........... *G05D 1/0858* (2013.01); *B64C 13/18* (2013.01); *B64C 13/503* (2013.01); *B64C 27/57* (2013.01)

(58) Field of Classification Search
CPC ...... G05D 1/0858; B64C 13/16; B64C 13/18; B64C 13/503; B64C 27/57
See application file for complete search history.

(56) References Cited

U.S. PATENT DOCUMENTS

| | | | |
|---|---|---|---|
| 6,648,269 B2 | 11/2003 | Gold et al. | |
| 7,195,200 B2* | 3/2007 | Yamane | B64C 13/20 244/17.13 |
| 7,873,445 B2* | 1/2011 | Schaeffer | B64C 29/0033 244/7 R |
| 7,930,074 B2 | 4/2011 | Cherepinsky et al. | |
| 8,231,085 B2 | 7/2012 | Cherepinsky | |
| 8,527,247 B1 | 9/2013 | Wilson et al. | |
| 9,802,694 B2* | 10/2017 | Luszcz | B64C 27/72 |
| 10,086,932 B2* | 10/2018 | Eller | B64C 27/04 |
| 2008/0243313 A1* | 10/2008 | Schaeffer | B64C 11/303 701/3 |
| 2010/0017048 A1 | 1/2010 | Sahasrabudhe et al. | |

(Continued)

FOREIGN PATENT DOCUMENTS

| | | | |
|---|---|---|---|
| EP | 2476614 A2 | 7/2012 | |
| WO | 2015152910 A1 | 10/2015 | |
| WO | WO-2016048437 A1 * | 3/2016 | ........... G05D 1/0669 |

OTHER PUBLICATIONS

Extended European Search Report; EP 17156675.5, dated Jul 13, 2017; 8 pages.

*Primary Examiner* — Philip J Bonzell
(74) *Attorney, Agent, or Firm* — Cantor Colburn LLP

(57) ABSTRACT

A method of controlling rotor moments includes receiving, in a flight control computer (FCC) a rotor moment reference value based on pilot inceptor inputs, sensing rotor moment from one or more sensors, receiving, in the FCC, a rotary wing aircraft condition parameter, and establishing, through the FCC, a rotor blade pitch angle for one or more of a plurality of rotor blades that counteracts external forces acting upon the rotary wing aircraft.

13 Claims, 4 Drawing Sheets

(56) References Cited

U.S. PATENT DOCUMENTS

| | | | |
|---|---|---|---|
| 2015/0203189 A1* | 7/2015 | Eller | G05D 1/0816 |
| | | | 244/17.13 |
| 2015/0314855 A1* | 11/2015 | Luszcz | B64C 27/72 |
| | | | 701/3 |
| 2017/0139045 A1* | 5/2017 | Cherepinsky | B64D 45/0005 |
| 2017/0210466 A1* | 7/2017 | Cherepinsky | G05D 1/0669 |
| 2017/0297694 A1* | 10/2017 | Luszcz | B64C 27/10 |
| 2018/0113478 A1* | 4/2018 | Greenfield | G05D 1/0638 |

\* cited by examiner

ROTOR MOMENT CONTROL SYSTEM FOR A ROTARY WING AIRCRAFT

CROSS-REFERENCE TO RELATED APPLICATIONS

The present application claims priority to U.S. Provisional Application No. 62/297,631, filed on Feb. 19, 2016, the contents of which are incorporated by reference herein in their entirety.

BACKGROUND

Exemplary embodiments pertain to aircraft flight control systems and, in particular, to a rotor moment control system for a rotary wing aircraft that reduces vehicle transients when transitioning between operating modes of the aircraft.

Fly-by wire (FBW) control systems are increasingly employed in the control of rotary-wing aircraft. Such FBW systems allow the aircraft to operate in one or more operational modes. In a ground control proportional mode, a pilot may use a control device, such as a cyclic, collective or pedals to directly control vehicle forces and moments and to counteract external forces such as wind. In response to cockpit control device inputs, an aircraft flight control system proportionally moves servos to adjust swashplate and blade pitch positions. In a model following controls or flight operational mode, a movement of the control device indicates a desired response of the aircraft. The desired response is interpreted by a control system which determines a configuration of the flight control surface that produces the desired response.

When transitioning from the ground control proportional mode to the flight control mode, a trim condition of the aircraft is taken from the control device (i.e., the cyclic) and is faded into a trim integrator of the control system. This transition may introduce a transient into the aircraft as a result of the control device being faded into the trim. The transients may introduce added complexity to an already complex scenario, e.g., transitioning from ground mode to flight mode in high winds.

BRIEF DESCRIPTION

Disclosed is a method of controlling rotor moments includes receiving, in a flight control computer (FCC), a rotor moment reference value based on pilot inceptor inputs, sensing rotor moment from one or more sensors, receiving, in the FCC, a rotary wing aircraft condition parameter, and establishing, through the FCC, a rotor blade pitch angle for one or more of a plurality of rotor blades that counteracts external forces acting upon the rotary wing aircraft.

In addition to one or more of the features described above or below, or as an alternative, further embodiments could include wherein receiving the rotor moment reference value includes receiving a cyclic inceptor position.

In addition to one or more of the features described above or below, or as an alternative, further embodiments could include wherein receiving the rotary wing aircraft condition parameter includes receiving signals from one or more weight-on-wheels sensors.

In addition to one or more of the features described above or below, or as an alternative, further embodiments could include wherein receiving signals from one or more weight-on-wheels sensors includes detecting a transition from a proportional ground control mode to a model following controls mode.

In addition to one or more of the features described above or below, or as an alternative, further embodiments could include wherein sensing rotor moment includes receiving signals from at least one sensor mounted to one of a rotor shaft, a rotor hub arm, and along a span of a rotor blade.

In addition to one or more of the features described above or below, or as an alternative, further embodiments could include wherein establishing, through the FCC, the rotor blade pitch angle includes comparing rotor moment inputs from at least two flight control computers.

In addition to one or more of the features described above or below, or as an alternative, further embodiments could include wherein establishing, through the FCC, the rotor blade pitch angle includes determining a rotor moment error and providing rotor moment feedback commands to one or more rotor blades.

In addition to one or more of the features described above or below, or as an alternative, further embodiments could include wherein establishing, through the FCC, the rotor blade pitch angle includes determining a rotor moment error and providing rotor moment feed forward commands to one or more rotor blades In addition to one or more of the features described above or below, or as an alternative, further embodiments could include wherein establishing, through the FCC, the rotor blade pitch angle includes combining rotor moment feedback commands and rotor moment feed forward commands to one or more rotor blades.

Also disclosed is a rotor moment control system for a rotary wing aircraft including a flight control computer (FCC) and a rotor moment control system configured to analyze rotor moments and reduce rotary wing aircraft transients during a transition from a proportional ground control mode and a model following controls mode, the rotor moment control system including computer readable program code embodied therewith, the computer readable program code, when executed by the FCC, causes the FCC to: receive a rotor moment reference value based on pilot inceptor inputs, sense rotor moment from one or more sensors, receive a rotary wing aircraft condition parameter, and establish a rotor blade pitch angle for one or more of a plurality of rotor blades that counteracts external forces acting upon the rotary wing aircraft.

In addition to one or more of the features described above or below, or as an alternative, further embodiments could include wherein the computer readable program code, when executed by the FCC, causes the FCC to: receive a cyclic position when receiving the rotor moment reference value includes receiving a cyclic inceptor position.

In addition to one or more of the features described above or below, or as an alternative, further embodiments could include wherein the computer readable program code, when executed by the FCC, causes the FCC to: receive signals from one or more weight-on-wheels sensors indicating a transition from a proportional ground control mode to a model following controls mode when receiving the rotary wing aircraft condition parameter.

In addition to one or more of the features described above or below, or as an alternative, further embodiments could include wherein establishing, through the processor, the rotor blade pitch angle includes comparing rotor moment inputs from at least two flight control computers.

In addition to one or more of the features described above or below, or as an alternative, further embodiments could include wherein the computer readable program code, when executed by the FCC, causes the FCC to: determine a rotor moment error and provide rotor moment feedback commands to one or more rotor blades when establishing the rotor blade pitch angle.

In addition to one or more of the features described above or below, or as an alternative, further embodiments could include wherein the computer readable program code, when executed by the FCC, causes the FCC to: combining rotor moment feedback commands and rotor moment feed forward commands to one or more rotor blades when establishing the rotor blade pitch angle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
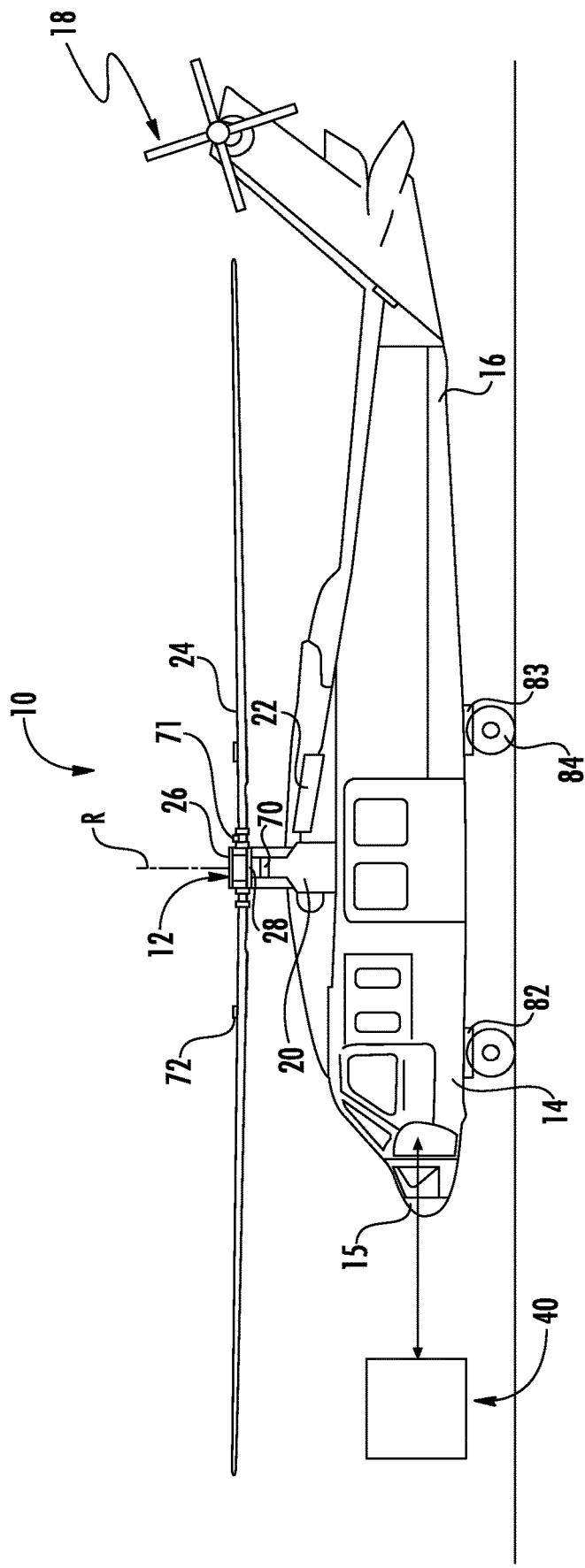
FIG. 1 depicts a rotary wing aircraft including rotor moment feedback control system, in accordance with an exemplary embodiment.

FIG. 1 schematically illustrates a rotary wing aircraft 10 having a main rotor assembly 12. The aircraft 10 includes an airframe 14 having a nose 15 an extending tail 16 which mounts a tail rotor assembly 18, such as an anti-torque system, a translational thrust system, a pusher propeller, a rotor propulsion system, and the like. The main rotor assembly 12 is driven about an axis of rotation R through a gearbox (illustrated schematically at 20) by one or more engines 22. Main rotor assembly 12 includes a plurality of rotor blades, one of which is indicated at 24, mounted to a rotor hub 26. A swashplate 28 provides control movements to rotor blades 24. More specifically, swashplate 28 is activated to affect a state or orientation of the rotor blades 24. Although a particular helicopter configuration is illustrated and described in the disclosed embodiment, other configurations and/or machines, such as high speed compound rotary wing aircraft with supplemental translational thrust systems, dual contra-rotating, or co-rotating coaxial rotor system aircraft, turbo-props, tilt-rotors and tilt-wing aircraft, may also benefit from the exemplary embodiments.

Figure 2:
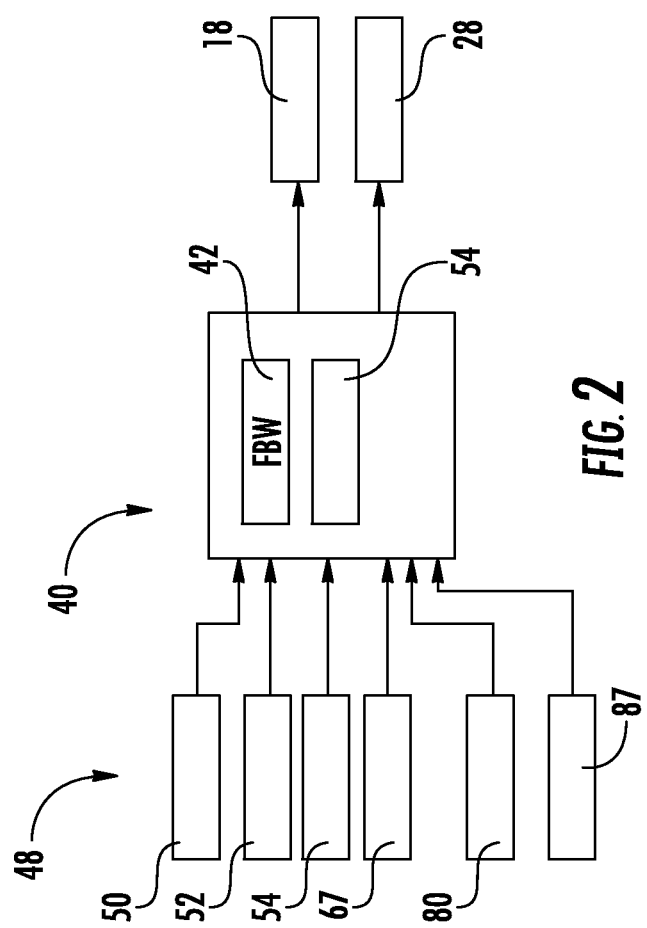
FIG. 2 is a block diagram illustrating a control system having a rotor moment control system, in accordance with an exemplary embodiment.

Rotary wing aircraft 10 includes a control system 40, illustrated in FIG. 2, which employs fly-by-wire (FBW) controls 42 that provide inputs to swashplate 28 and/or tail rotor assembly 18. A plurality of control inceptor devices 48 including a cyclic incepter 50, a collective inceptor 52 and pedals 54 provide input to control system 40. The commands provided by control inceptor devices 48 through control system 40 depend on an operational mode of rotary wing aircraft 10.

One operational mode of control system 40 is a proportional ground control mode. In the ground control mode, cyclic 50 may be employed to change a pitch angle of the rotor blades 24 in a cyclical fashion to effectively tilt swashplate 28 in a particular direction, resulting in movement of rotary wing aircraft 10. In the same mode, collective inceptor 52 changes a pitch angle of the rotor blades 24 collectively, resulting in an increase or decrease in total lift derived from main rotor assembly 12. Pedals 54 serve to control tail rotor 18 to adjust yaw or a direction of nose 15. The proportional ground control mode provides a change in a position of a flight control surface (not separately labeled) of rotary wing aircraft 10 in direct proportion to a movement of one or more of control inceptor devices 48. For example, a position or orientation of swashplate 28 is in direct proportion to a position of cyclic inceptor 50.

Another operational mode of the control system is a model following control or flight mode. In the flight mode, control system 40 receives one or more pilot inputs, performs various calculations on the one or more received inputs using an inverse model of rotary wing aircraft 10, and then moves a corresponding flight control surface to a determined position. Often times, both of these flight control operational modes are employed by a pilot during aircraft operations. Transitioning from the proportional ground control mode to the model following control mode can sometimes cause an unwanted transients, particularly in high wind conditions.

Control inceptors devices 48 perform different functions depending on the particular operational mode. For example, in order to maintain swashplate 28 in a particular non-centered configuration in the proportional ground control mode, cyclic inceptor 52 held out of a detent or centered position. However, in the flight mode, commands received from control inceptor devices 48 command an aircraft state, rather than a position of swashplate 28. Further, the flight mode swashplate 28 may be commanded to a non-centered position by the control system 40, even while a unique trim inceptor is in detent. More specifically, cyclic inceptor 52 remains in the detent position unless a change is desired in the aircraft state (rates, attitudes, positions, velocities, etc.). To affect a desired change, the pilot moves cyclic inceptor 50 out of the detent position.

In accordance with an aspect of an exemplary embodiment, control system 40 includes a rotor moment control system 64 that selectively operates one or more control surfaces (not separately labeled) on rotor blades 24 to counter-act external forces on rotary wing aircraft 10 when transitioning from the proportional ground control mode to the model following controls or flight mode. For example, rotor moment control system 64 may selectively activate the one or more control surfaces to counter-act wind forces acting on rotary wing aircraft 10.

As will be detailed more fully below, rotor moment control system 64 receives inputs from a rotor moment sensor system 67 that may include one or more rotor moment sensors 70, 71, and 72. Rotor moment sensor 70 may be mounted to a rotor shaft (not separately labeled), rotor moment sensor 71 may be mounted to a rotor hub arm (also not separately labeled) and rotor moment sensor 72 may be mounted to one or more of rotor blades 24. Rotor moment sensors 70-72 may take on a variety of forms including fiber optic strain gauges, laser displacement sensors that measure blade flap/lag bending and movement, electrical strain gauges, accelerometers and the like. Further, it should be understood that the number and location of rotor moment sensors may vary.

Rotor moment control system 64 may also receive input from an aircraft condition parameter sensor system 80.

Aircraft condition parameter sensor system 80 may include a first weight-on-wheels (WOW) sensor 82, a second WOW sensor 83, and a third WOW sensor 84. First WOW sensor 82 may be associated with a forward landing gear (not separately labeled). Second WOW sensor 83 may be associated with an aft landing gear (also not separately labeled) and third WOW sensor 84 may constitute a tire pressure sensor. WOW sensors 82, 83, and/or 84 detect whether aircraft 10 is resting on the ground. When WOW sensors 82, 83 and/or 84 no longer sense weight on wheels, a determination may be made that rotary wing aircraft 10 is transitioning from the proportional ground control mode to the model following controls or flight mode. WOW sensors 82-84 may take a variety of forms including strut mounted strain gauges, axle mounted strain gauges, tire pressure sensors, inertial movement sensors, solid state switches and the like. The number and location of rotor moment sensors and WOW sensors may vary. Rotor moment control system 64 may also receive cyclic position reference inputs from a cyclic position reference sensor 87.

Figure 3:
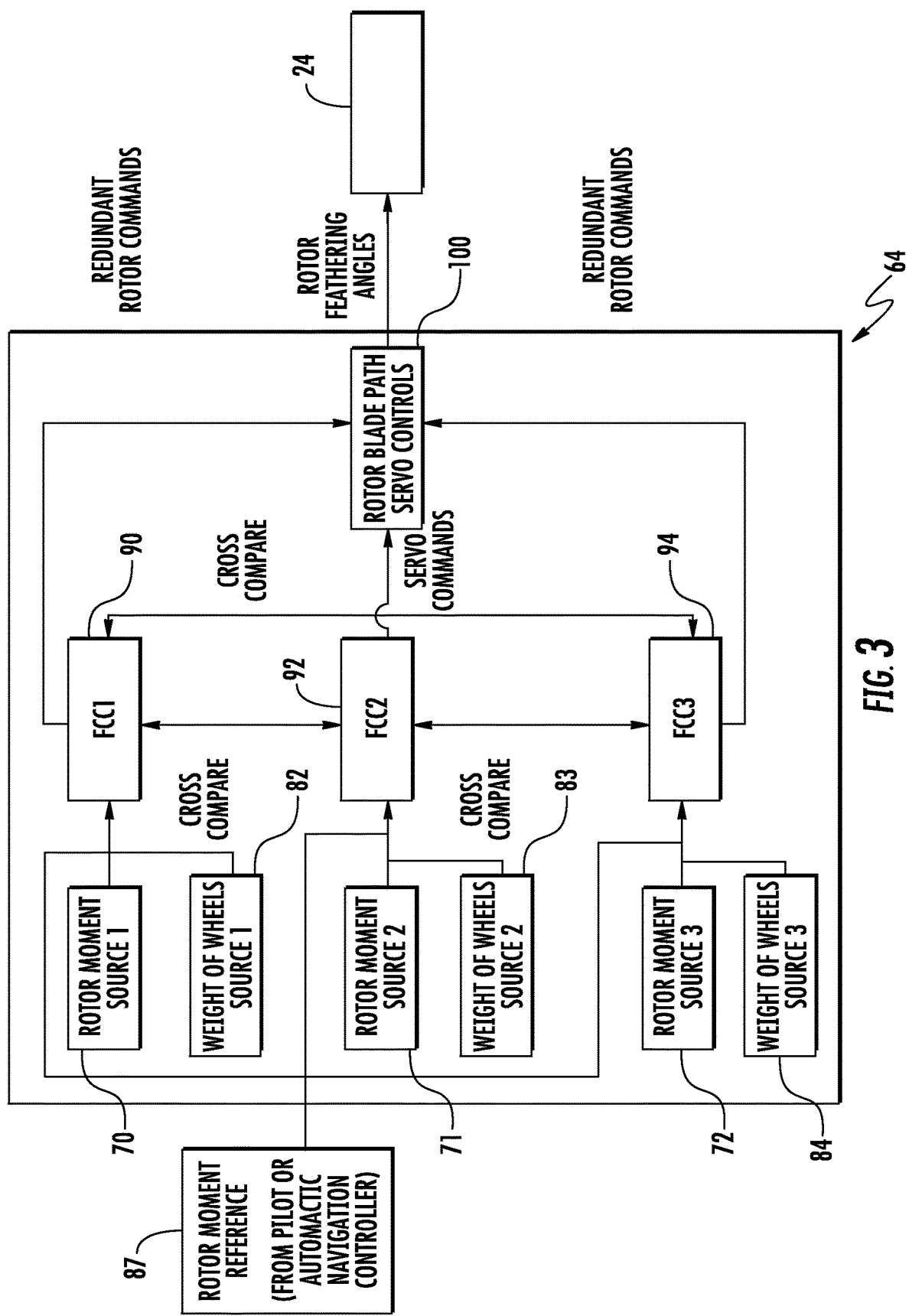
FIG. 3 is a block diagram illustrating the rotor moment control architecture across a system of hardware and software components, in accordance with an aspect of an exemplary embodiment.

In accordance with an exemplary embodiment illustrated in FIG. 3, rotor moment control system 64 includes a first flight control computer (FCC) 90, a second FCC 92, and a third FCC 94. Each FCC includes one or more processors that cooperate to establish rotor blade control surface positions that avoid system transients as will be detailed below. At this point, it should be understood that the number and location of FCC's in rotary wing aircraft 10 may vary.

First FCC is operatively connected with rotor moment sensor 70 and WOW sensor 82. Rotor moment sensor 70 and WOW sensor 82 are also operatively connected with third FCC 94. Second FCC 92 is operatively connected with rotor moment sensor 71, WOW sensor 83 and cyclic position reference sensor 87. Third FCC 94 is operatively connected with rotor moment sensor 72, and WOW sensor 84. As will be detailed more fully below, first, second, and third FCCs 90, 92, and 94 are functionally and operatively connected with one another to actuate rotor blade pitch servo controls 100 in order to counter-act external forces on rotary wing aircraft 10 when transitioning from the proportional ground control mode to the model following controls or flight mode.

Figure 4:
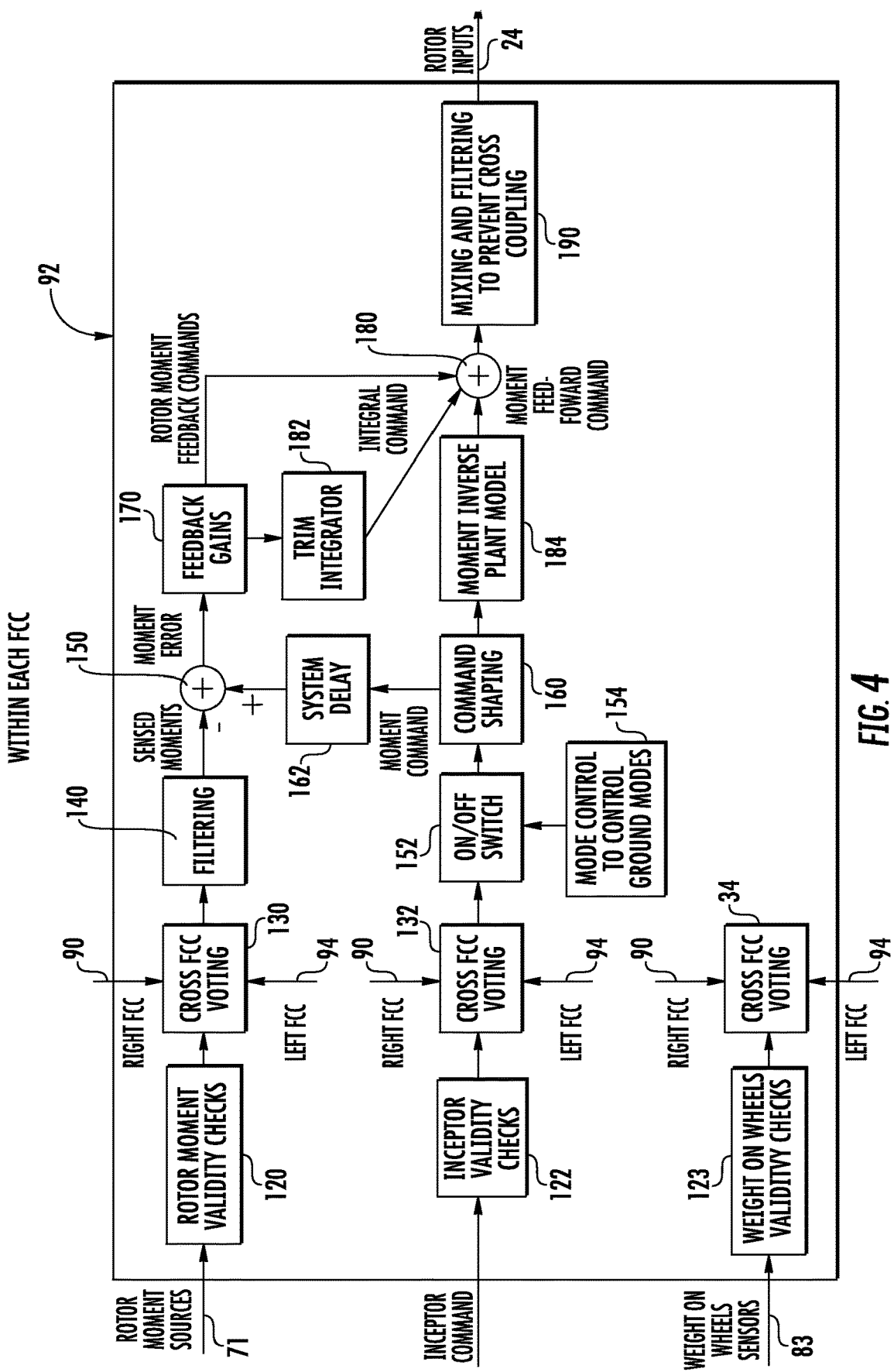
FIG. 4 depicts a block diagram describing a control algorithm which each flight control computer (FCC) of the rotor moment control architecture of FIG. 3.

Reference will now follow to FIG. 4 in describing FCC 92 with an understanding that FCC 90 and FCC 94 may include similar components having similar functions. FCC 92 includes a rotor moment check module 120, an incepter check module 122 and a WOW check module 123. Rotor moment check module 120 verifies rotor moment signals received from, for example, rotor moment sensor 71. Incepter check module 122 validates signals received from cyclic incepter 50, and WOW check module 123 verifies signals received from, for example, WOW sensor 83. FCC 92 also includes a plurality of cross voting or cross verification modules 130, 132, and 134. Cross verification module 130 verifies rotor moment signals received from first and third FCCs 90 and 94. Cross verification module 132 verifies cyclic inceptor signals received from first and third FCCs 90 and 94, and cross verification module 132 verifies WOW signals received from first and third FCCs 90 and 94.

In accordance with an aspect of an exemplary embodiment, FCC 92 includes a filter 140 operatively connected to cross verification module 130. Filter 140 passes filtered rotor moment signals to a first summer 150. FCC 92 further includes a switch 152 operatively connected to cross verification module 130, and through a mode control module 154 to cross verification module 134. Mode control module 154 is configured to control ground modes. Switch 152 is operatively connected to a command shaping module 160 which, in turn, is operatively connected to a system delay 162 that is coupled to first summer 150.

In further accordance with an exemplary embodiment, FCC 92 includes a feedback gain module 170 operatively connected to first summer 150. Feedback gain module 170 sends a first feedback gain signal to a second summer 180 and a second feedback gain signal to a trim integrator 182 which provides an integral trim command to second summer 180. FCC 92 also includes a moment inverse module 184 operatively connected between command shaping module 160 and second summer 180. Moment inverse module 184 provides feedforward commands to second summer 180.

In accordance with an aspect of an exemplary embodiment, second summer 180 combines signals from feedback gain module 170, trim integrator module 182 and moment inverse module 184. A combined signal is then passed to a mixing and filtering module 190 which substantially eliminates cross-coupling. A trim control signal is then passed to rotor blades 24. In this manner, rotor moment control system 64 may establish a wind compensated neutral for cyclic incepter 50 and dampens system transients for rotor blades 24 when rotary wing aircraft 10 transitions from the proportional ground control mode to the model following controls or flight mode.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling rotor moments comprising:
   receiving, in a flight control computer (FCC), a rotor moment reference value based on pilot inceptor inputs;
   sensing rotor moment from one or more sensors;
   detecting, in the FCC, transition between a proportional ground control mode to a model following controls mode by receiving signals from one or more weight-on-wheels sensors; and
   establishing, through the FCC, a rotor blade pitch angle for one or more of a plurality of rotor blades that counteracts external forces acting upon the rotary wing aircraft during the transition.

2. The method of claim 1, wherein receiving the rotor moment reference value includes receiving a cyclic inceptor position.

3. The method of claim 1, wherein receiving signals from one or more weight-on-wheels sensors includes detecting a transition from the proportional ground control mode to the model following controls mode.

4. The method of claim 1, wherein sensing rotor moment includes receiving signals from at least one sensor mounted to one of a rotor shaft, a rotor hub arm, and along a span of a rotor blade.

5. The method of claim 1, wherein establishing, through the FCC, the rotor blade pitch angle includes comparing rotor moment inputs from at least two flight control computers.

6. The method of claim 1, wherein establishing, through the FCC, the rotor blade pitch angle includes determining a rotor moment error and providing rotor moment feedback commands to one or more rotor blades.

7. The method of claim 1, wherein establishing, through the FCC, the rotor blade pitch angle includes determining a rotor moment error and providing rotor moment feed forward commands to one or more rotor blades.

8. The method of claim 1, wherein establishing, through the FCC, the rotor blade pitch angle includes combining rotor moment feedback commands and rotor moment feed forward commands to one or more rotor blades.

9. A control system for a rotary wing aircraft comprising:
a flight control computer (FCC);
a rotor moment control system configured to analyze rotor moments and reduce rotary wing aircraft transients during a transition from a proportional ground control mode and a model following controls mode, the rotor moment control system including computer readable program code embodied therewith, the computer readable program code, when executed by the FCC, causes the FCC to:
receive a rotor moment reference value based on pilot inceptor inputs;
sense rotor moment from one or more sensors;
detect a transition between a proportional ground control mode to a model following controls mode by receiving signals from one or more weight-on-wheels sensors; and
establish a rotor blade pitch angle for one or more of a plurality of rotor blades that counteracts external forces acting upon the rotary wing aircraft.

10. The system of claim 9, wherein the computer readable program code, when executed by the FCC, causes the FCC to: receive a cyclic position when receiving the rotor moment reference value includes receiving a cyclic inceptor position.

11. The system of claim 9, wherein establishing, through the processor, the rotor blade pitch angle includes comparing rotor moment inputs from at least two flight control computers.

12. The system of claim 9, wherein the computer readable program code, when executed by the FCC, causes the FCC to: determine a rotor moment error and provide rotor moment feedback commands to one or more rotor blades when establishing the rotor blade pitch angle.

13. The system of claim 9, wherein the computer readable program code, when executed by the FCC, causes the FCC to: combining rotor moment feedback commands and rotor moment feed forward commands to one or more rotor blades when establishing the rotor blade pitch angle.

* * * * *